Feb. 19, 1935.  S. G. DOWN  1,991,883
FLUID PRESSURE BRAKE
Filed Dec. 17, 1931
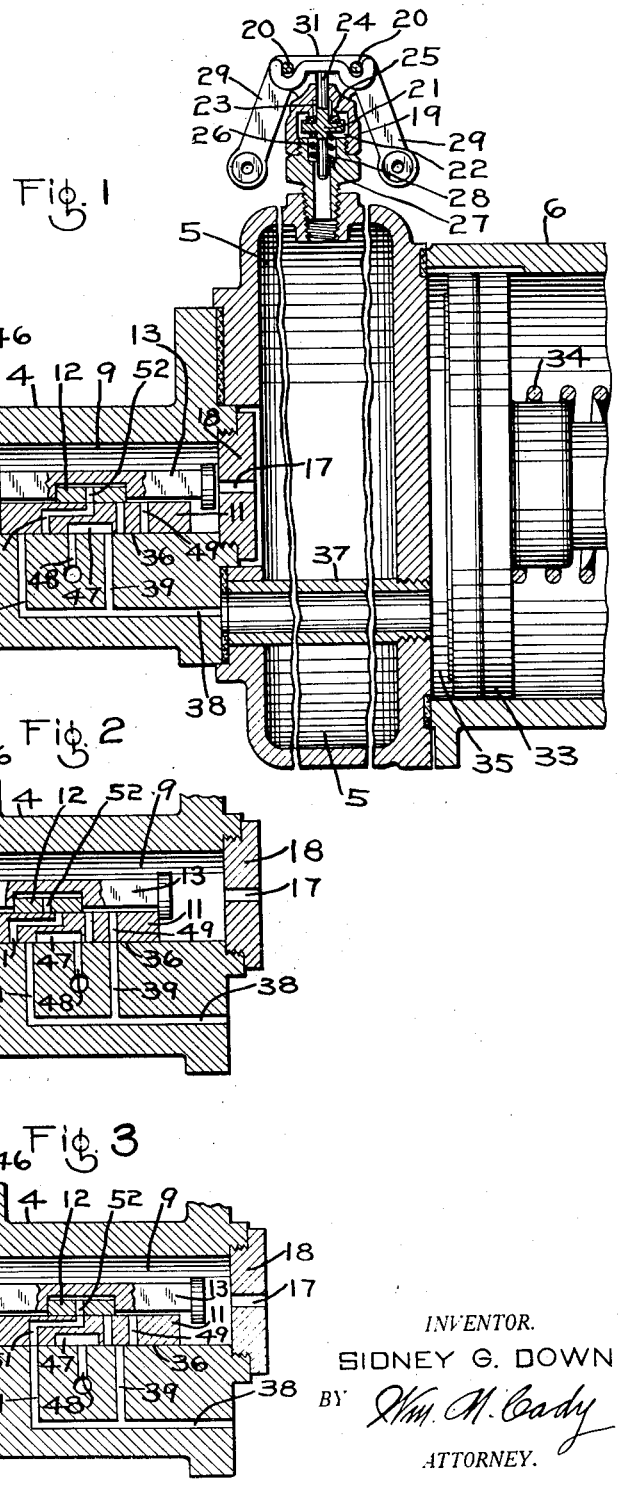
INVENTOR.
SIDNEY G. DOWN
BY Wm. M. Cady
ATTORNEY.

Patented Feb. 19, 1935

1,991,883

UNITED STATES PATENT OFFICE 1,991,883

FLUID PRESSURE BRAKE

Sidney G. Down, Edgewood, Pa., assignor to The Westinghouse Air Brake Company, Wilmerding, Pa., a corporation of Pennsylvania Application December 17, 1931, Serial No. 581,581

8 Claims. (Cl. 303—70)

This invention relates to fluid pressure brakes for railway rolling stock and particularly to the triple valves for controlling the brakes on the cars of a train.

The usual triple valve device of a car brake equipment is responsive to a sudden or heavy reduction in brake pipe pressure to cause movement of the valve from release to emergency position wherein communication is established whereby the brake cylinder is supplied with fluid under pressure from the auxiliary reservoir that is charged with fluid pressure from the brake pipe.

Usually upon restoration of the brake pipe pressure above that in the auxiliary reservoir after an application of the brakes, the valve automatically moves to a lap position wherein the auxiliary reservoir is closed to the brake pipe and the brake cylinder is closed to atmosphere and to the auxiliary reservoir.

In the event that it is desired to "setout" or remove a car from the train, the angle cock in the brake pipe of the car on the locomotive end of the train which is adjacent the car being removed, is closed and the brake pipe hose connection is broken. This causes an emergency application of the brakes on the car removed by reason of the reduction in brake pipe pressure on that car at an emergency rate. The triple valve device moves to emergency position and compresses the graduating spring thereof, where it remains.

In order to release the brakes on the car "set out", the trainman operates the usual auxiliary reservoir release valve so as to vent fluid from the auxiliary reservoir. With the triple valve device in emergency position, fluid is then vented from the brake cylinder as well as the auxiliary reservoir by back flow from the brake cylinder through the usual emergency port in the main slide valve to the auxiliary reservoir.

Fluid continues to be released from the brake cylinder by way of the auxiliary reservoir, until reduction in auxiliary reservoir pressure is such that the graduating spring acts to shift the triple valve piston and the main and auxiliary slide valves to emergency lap position. In emergency lap position, flow of fluid from the brake cylinder to the auxilary reservoir is cut off so that further release of fluid from the brake cylinder is prevented. The brakes, therefore, cannot be released until the car is again coupled to a train brake pipe and the brake pipe pressure is restored so as to shift the triple valve device to release position or until the fluid under pressure within the brake cylinder has escaped by slow leakage to the atmosphere.

An object of this invention is to provide means in a triple valve device for establishing communication from the brake cylinder to the auxiliary reservoir upon movement of the triple valve device to emergency lap position so that the pressure in the brake cylinder may be reduced through the auxiliary reservoir when the latter is vented by opening of the release valve in the auxiliary reservoir by a trainman or other authorized person.

A further object of the invention is to provide a triple valve device having the above noted characteristics that may embody the improved feature without necessitating material alterations in the standard triple valves as now employed.

These and other objects that will be made apparent throughout the further description of the invention are attained in the triple valve device hereinafter described and illustrated in the accompanying drawing, wherein;

Fig. 1 is an elevational view, partly in section, of a combined triple valve, auxiliary reservoir and brake cylinder embodying features of my invention and showing the main and graduating valve and parts of the brake system in release position;

Fig. 2 is an elevational view, partly in section, of the triple valve shown in Fig. 1 with the main and graduating valves in emergency position, and Fig. 3 is a view similar to Fig. 2 showing the main and graduating valve in emergency lap position.

Referring to the drawing, the invention comprises a triple valve device 4 that is attached to an auxiliary reservoir 5 which in turn is connected to a brake cylinder 6. The triple valve device comprises a casing having a chamber 8 containing a piston 7 and having a valve chamber 9 at the opposite side containing a main slide valve 11 and a graduating slide valve 12 adapted to be operated through a stem 13 by the piston 7 in the usual manner.

The triple valve device is provided with the usual graduating stem 15 that is normally yieldingly retained in the position shown in Fig. 1 by means of a spring 16. As shown in Fig. 1, the main and graduating slide valves and the piston 7 are in the release position.

The auxiliary reservoir 5 is of the usual type and permanently communicates with the valve chamber 9 through a passage 17 disposed in the threaded head 18 of the triple valve casing. The auxiliary reservoir 5 is provided with the usual release valve device 19 having a valve 21 disposed within a valve chamber 22 and which closes a passage 23 to the atmosphere. The valve 21 is normally retained in closed position against the annular seat rib 25 by means of a spring 26 disposed between the valve 21 and a shoulder 27 of the recess 28 in which the spring is mounted. A rocking lever 29 that is pivotally mounted upon a bracket 31 for movement about two pivots 20, engages the valve stem 24 and moves the valve to open position when the lever 29 is actuated. The lever is usually operated by a pull rod, not shown, which is accessible from the side of the car.

The brake cylinder 6 is of the usual type and contains a piston 33 that is normally retained in the release position by means of a spring 34 in the usual manner. Communication is established between the chamber 35 of the brake cylinder and the valve seat 36 of the triple valve device through pipe 37 extending through the auxiliary reservoir, passage 38 and passages 39 and 41.

When the brake equipment above described is in the release position shown in Fig. 1, fluid is supplied to the auxiliary reservoir from the brake pipe 42, through branch pipe 43, chamber 44 containing the graduating stem 15, passages 45, piston chamber 8, the feed groove 46, around the piston 7, the valve chamber 9 and passage 17. In the release position, brake cylinder 6 is open to the atmosphere through pipe 37, passage 38, passage 39, cavity 47 in the slide valve 11 and passage 48 to atmosphere. When it is desired to "set out" or remove a car from a train, the angle cock on the adjacent car on the locomotive end of the train is closed and the hose connection of the brake pipe broken. The disconnection of the brake pipe causes a reduction in brake pipe pressure in the brake pipe of the car at an emergency rate and causes the slide valve to move to the emergency position shown in Fig. 2. This operation of the triple valve device is occasioned by the higher pressure on the right face of the piston 7. It will be observed that when the slide and graduating valves are in the emergency position, fluid under pressure flows from the auxiliary reservoir 5 through the passage 17, valve chamber 9, emergency port 49 in the slide valve 11, passages 39 and 38 and pipe 37. By reason of this movement of the triple valve device the brakes on the car are applied as in the case of an emergency application of the brakes.

Since the brake pipe 42 on the car is open to atmosphere the piston 7 will be retained in the emergency position shown in Fig. 2.

In order to release the brakes on the "set out" car, the trainman operates the valve lever 29 so as to unseat the release valve 21 and thereby permit the venting of fluid under pressure from the auxiliary reservoir to the atmosphere.

Fluid under pressure is also vented from the brake cylinder by back flow through the passage 39 and emergency port 49 to the valve chamber 9 and the auxiliary reservoir, but when the auxiliary reservoir pressure has been reduced to an extent sufficient to permit the spring 16 to move the piston 7, the triple valve parts will be moved back to a lap position shown in Figure 3. In this position the passage 39 is lapped by the slide valve 11 so that fluid under pressure cannot then flow back from the brake cylinder to the auxiliary reservoir, so that the brake cylinder pressure will not be released as the auxiliary reservoir pressure is further reduced.

According to my invention, an additional passage 41 leading from the brake cylinder passage 38 to the seat of the slide valve 11 is provided, and this passage is adapted to register, in the Fig. 3 position of the valve parts with a port 51 in the main slide valve 11, which in turn registers with a port 52 in the graduating valve 12.

It will now be seen that when the parts of the triple valve device are shifted by the graduating spring to the lap position shown in Figure 3, communication is established between the brake cylinder and the auxiliary reservoir through pipe 37, passages 38 and 41, passage 51 in the main slide valve 7, port 52 in the graduating slide valve, valve chamber 9 and passage 17, and that fluid may continue to flow from the brake cylinder back through the auxiliary reservoir to the atmosphere so long as the release valve 21 is maintained in open position by the trainman. Venting of the brake cylinder in this manner permits the spring 34 to move the brake piston 33 to the release position and to thereby release the brakes.

When the brake pipe of the car is again coupled to the brake pipe of a train charged with fluid under pressure, the triple valve device will be moved to the release position shown in Fig. 1 when fluid pressure is again supplied to the piston chamber 8. The auxiliary reservoir will then be charged by fluid under pressure passing around the piston 7 through the feed groove 46 into the valve chamber 12 and thence to the auxiliary reservoir through the passage 17. The brake cylinder will then be open to the atmosphere as before described.

It is apparent from the foregoing that the provision for releasing the brakes of a car "set out" or removed from the train, comprises simply the addition of certain passages and ports in the standard triple valve construction. This change does not necessitate any alterations in the form and construction of the triple valve parts and, therefore, is relatively inexpensive.

While I have shown but one embodiment of the invention it is obvious that alterations, additions and omissions may be made to the triple valve device described without departing from the spirit of the invention.

Having now described my invention, what I claim as new and desire to secure by Letters Patent, is:

1. In a fluid pressure brake, the combination with a brake pipe, auxiliary reservoir, and brake cylinder, of a triple valve device comprising a piston and valve means operated by said piston upon a reduction in brake pipe pressure for opening communication through which fluid under pressure is supplied from the auxiliary reservoir to the brake cylinder and operated upon a reduction in auxiliary reservoir pressure following a reduction in brake pipe pressure to a position for closing said communication, said valve means being adapted in said position to establish an additional communication from the brake cylinder to the auxiliary reservoir.

2. In a fluid pressure brake, the combination with a brake pipe, auxiliary reservoir and brake cylinder, of a triple valve device comprising a piston, valve means operated by said piston upon a reduction in brake pipe pressure for opening communication through which fluid under pressure is supplied from the auxiliary reservoir to the brake cylinder and operated upon a reduction in auxiliary reservoir pressure following a reduction in brake pipe pressure to a position for closing said communication, said valve means being adapted in said position to establish an additional communication from the brake cylinder to the auxiliary reservoir, and manually operable means for venting fluid from the auxiliary reservoir.

3. In a fluid pressure brake, the combination with a brake pipe, auxiliary reservoir and brake cylinder, of a triple valve device comprising a piston, and valve means operated by said piston upon a reduction in brake pipe pressure for opening communication through which fluid under pressure is supplied from the auxiliary reservoir to the brake cylinder and operated upon a reduction in auxiliary reservoir pressure following a reduction in brake pipe pressure to a position for closing said communication, said valve means being adapted in said position to establish an additional communication from the brake cylinder to the atmosphere, and manually operable means for controlling the fluid flowing through said communication.

4. In a fluid pressure brake, the combination with a brake pipe, auxiliary reservoir and brake cylinder, of a triple valve device for controlling the brakes comprising a valve means, a piston for operating the valve means responsive to variations in pressure in the brake pipe and the auxiliary reservoir and adapted to move the valve means to a position wherein communication is opened through which fluid under pressure is supplied from the auxiliary reservoir to the brake cylinder in response to a predetermined pressure differential between that in the brake pipe and the auxiliary reservoir, and to move the valve means to another position in response to another predetermined pressure differential between that in the brake pipe and the auxiliary reservoir for closing said communication, said valve means being adapted in said last position to establish an additional communication from the brake cylinder to the auxiliary reservoir.

5. In a fluid pressure brake, the combination with a brake pipe, an auxiliary reservoir, a brake cylinder, and a triple valve device having a valve responsive to pressures in the brake pipe and auxiliary reservoir and movable from the release position normally maintained by normal brake pipe pressure wherein the brake cylinder is open to the atmosphere and the auxiliary reservoir is open to the brake pipe, to emergency position wherein the brake cylinder is closed to atmosphere and open to the auxiliary reservoir, in response to a reduction in brake pipe pressure, and movable to lap position wherein the brake cylinder is closed to atmosphere and to the auxiliary reservoir in response to a predetermined reduction in auxiliary reservoir pressure following a reduction in brake pipe pressure, of manually operable means for reducing the auxiliary reservoir pressure for moving the valve device to lap position, and means, including a graduating valve cooperating with the said valve, for establishing communication between the auxiliary reservoir and the brake cylinder when the valve device is in lap position, whereby the brake cylinder pressure may be reduced to that in the auxiliary reservoir.

6. In a fluid pressure brake, the combination with a brake pipe, an auxiliary reservoir, a brake cylinder, and a triple valve device having a valve responsive to pressures in the brake pipe and auxiliary reservoir and movable in response to a reduction in brake pipe pressure from the release position normally maintained by normal brake pipe pressure wherein the brake cylinder is open to the atmosphere and the auxiliary reservoir is open to the brake pipe, to emergency position wherein the brake cylinder is closed to atmosphere and open to the auxiliary reservoir through a passage controlled by said valve and movable in response to a predetermined reduction in auxiliary reservoir pressure to lap position wherein the brake cylinder is closed to atmosphere and to the auxiliary reservoir, of manually operable means for reducing the auxiliary reservoir pressure for moving the valve device to lap position and for exhausting the auxiliary reservoir, and means in the valve device for establishing communication between the auxiliary reservoir and the brake cylinder through another passage when the valve device is in lap position, whereby the brake cylinder pressure may be reduced to that in the auxiliary reservoir.

7. In a fluid pressure brake, the combination with a brake pipe, an auxiliary reservoir, and a brake cylinder, of a brake controlling valve device operatively controlled by variations in brake pipe pressure and auxiliary reservoir pressure, said valve device including a main valve and an auxiliary valve, said main valve being adapted in the normal position thereof to establish a communication through which the brake cylinder is open to atmosphere, and adapted also when moved into a second position, in response to a reduction in brake pipe pressure, to close said atmospheric communication and establish a communication through which fluid under pressure from the auxiliary reservoir is supplied to the brake cylinder to effect an application of the brakes, said main valve being movable into a third position in which it closes both of said communications, in response to a reduction in auxiliary reservoir pressure following said reduction in brake pipe pressure, said auxiliary valve being adapted, when said main valve is in said third position, to establish a communication between said brake cylinder and said auxiliary reservoir.

8. In a fluid pressure brake, the combination with a brake pipe, an auxiliary reservoir, a brake cylinder, of a brake controlling valve device operatively responsive to variations in brake pipe pressure, said valve device having valve means adapted to be moved from a brake release position, in which said brake cylinder is open to atmosphere, to one position in which fluid under pressure is supplied from the auxiliary reservoir to the brake cylinder at a certain rate and to another position in which fluid under pressure is supplied from the auxiliary reservoir to the brake cylinder at a rate higher than said certain rate, and graduating spring means effective to resist movement of said valve means to said second position from said one position, and adapted upon a reduction in auxiliary reservoir pressure below a predetermined pressure, occurring when said valve means is in said second position, to move said valve means from said second position to a third position, said valve means being adapted in said third position to establish a communication between said brake cylinder and said auxiliary reservoir.

SIDNEY G. DOWN.